US010498832B2

(12) United States Patent
Castil et al.

(10) Patent No.: US 10,498,832 B2
(45) Date of Patent: Dec. 3, 2019

(54) LINK-TRAINING AUTO-NEGOTIATION PROTOCOL WITH THREE-WAY HANDSHAKE

(71) Applicant: Oracle International Corporation, Redwood Shores, CA (US)

(72) Inventors: Carlos Alexander Castil, Mountain View, CA (US); Arvind Srinivasan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 15/647,043

(22) Filed: Jul. 11, 2017

(65) Prior Publication Data

US 2019/0020724 A1 Jan. 17, 2019

(51) Int. Cl.
*G06F 15/16* (2006.01)
*H04L 29/08* (2006.01)
*H04L 12/26* (2006.01)

(52) U.S. Cl.
CPC ............ *H04L 67/141* (2013.01); *H04L 43/08* (2013.01)

(58) Field of Classification Search
CPC ............................ H04L 67/141; H04L 43/08
USPC ......................................... 709/227–228, 230
See application file for complete search history.

(56) References Cited

U.S. PATENT DOCUMENTS

| 6,988,140 B2* | 1/2006 | Chintalapati | H04L 67/142 709/227 |
| 8,224,966 B2* | 7/2012 | Tate | H04L 67/1002 709/228 |
| 8,953,605 B1* | 2/2015 | Mehra | H04L 45/58 370/392 |
| 9,825,911 B1* | 11/2017 | Brandwine | H04L 67/141 |
| 2006/0047839 A1* | 3/2006 | Tate | H04L 67/2814 709/230 |
| 2012/0151069 A1* | 6/2012 | Eller | H04L 67/14 709/227 |
| 2016/0352800 A1* | 12/2016 | Mulcahy | H04L 43/08 |

* cited by examiner

*Primary Examiner* — Bharat Barot
(74) *Attorney, Agent, or Firm* — Park, Vaughan, Fleming & Dowler LLP

(57) ABSTRACT

The disclosed embodiments relate to a system that initializes communications across a communication link. During operation, the system uses a three-way handshake protocol to communicate a request containing target first-side link parameters from a first side of the communication link to a second side of the communication link. The system also uses the three-way handshake protocol to communicate a request containing target second-side link parameters from the second side of the communication link to the first side of the communication link. Next, the system determines actual link parameters based on the target first-side link parameters and the target second-side link parameters, and configures the communication link based on the actual link parameters.

20 Claims, 4 Drawing Sheets

LINK-TRAINING AUTO-NEGOTIATION PROTOCOL WITH THREE-WAY HANDSHAKE

BACKGROUND

Field

The disclosed embodiments generally relate to techniques for initializing optical communication links. More specifically, the disclosed embodiments relate to a link-training auto-negotiation protocol that uses three-way handshakes while initializing an optical communication link.

Related Art

As optical networks become increasingly fast, the signals transmitted through the optical networks are becoming progressively more sensitive to noise, which can give rise to errors in transmitted data. In order to reduce this noise to acceptable levels, it is becoming necessary to perform initialization operations to tune the individual components in the optical transmitters and receivers in the optical links to filter out the noise. This tuning process is both complicated and time-consuming. Moreover, the tuning process is incompatible with existing link initialization protocols, which require initialization operations to complete within fixed time intervals, because it is typically not possible to know in advance how much time the tuning process will require.

Hence, what is needed is a technique for initializing an optical link that provides sufficient flexibility to accommodate a time-consuming tuning operation to filter out unwanted noise.

SUMMARY

The disclosed embodiments relate to a system that initializes communications across a communication link. On a first side of the communication link, the system uses a three-way handshake protocol to send a request containing target first-side link parameters from the first side of the communication link to a second side of the communication link. The system also uses the three-way handshake protocol to receive a request containing target second-side link parameters from the second side of the communication link at the first side of the communication link. Next, the system determines actual link parameters based on the target first-side link parameters and the target second-side link parameters, and configures the communication link based on the actual link parameters.

Similarly, on the second side of the communication link, the system uses the three-way handshake protocol to send a request containing target second-side link parameters from the second side of the communication link to the first side of the communication link. Then, the system uses the three-way handshake protocol to receive a request containing target first-side link parameters from the first side of the communication link at the second side of the communication link. Next, the system determines actual link parameters based on the target first-side link parameters and the target second-side link parameters, and configures the communication link based on the actual link parameters.

In some embodiments, while configuring the communication link, the system additionally: increases a speed of the communication link based on the determined actual link parameters. Next, the system enters a testing phase, wherein training sequences and associated messages are sent across the communication link, test results are obtained, and link parameters are adjusted accordingly to tune the communication link.

In some embodiments, the target first-side link parameters, the target second-side link parameters, and the actual first-side link parameters include: a link speed; a lane width for the communication link; a lane ordering for the communication link; a port bifurcation associated with the communication link; and optimal equalization settings for the communication link.

In some embodiments, the communication link uses the InfiniBand™ networking protocol, and the three-way handshake protocol is implemented as an extension to the InfiniBand™ networking protocol.

In some embodiments, prior to using the three-way handshake protocol, the system determines whether the first and second sides of the communication link are configured to use the extension to the InfiniBand™ networking protocol. If either the first or second side of the communication link is not configured to use the extension, the system reverts to using the unextended InfiniBand™ networking protocol without the three-way handshake to initialize the communications across the communication link.

In some embodiments, after the process of configuring the communication link based on the actual link parameters completes, the system enters a LinkUp state for the InfiniBand™ networking protocol.

In some embodiments, when the system uses the three-way handshake to send a request to a destination, the system first sends the request to the destination, and in response receives a request-acknowledgment from the destination. Next, the system sends an acknowledgment-acknowledgment to the destination.

In some embodiments, when the system uses the three-way handshake to receive a request from a source, the system first receives the request from the source and in response sends a request-acknowledgment to the source. Next, the system receives an acknowledgment-acknowledgment from the source.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Details

Figure 1:
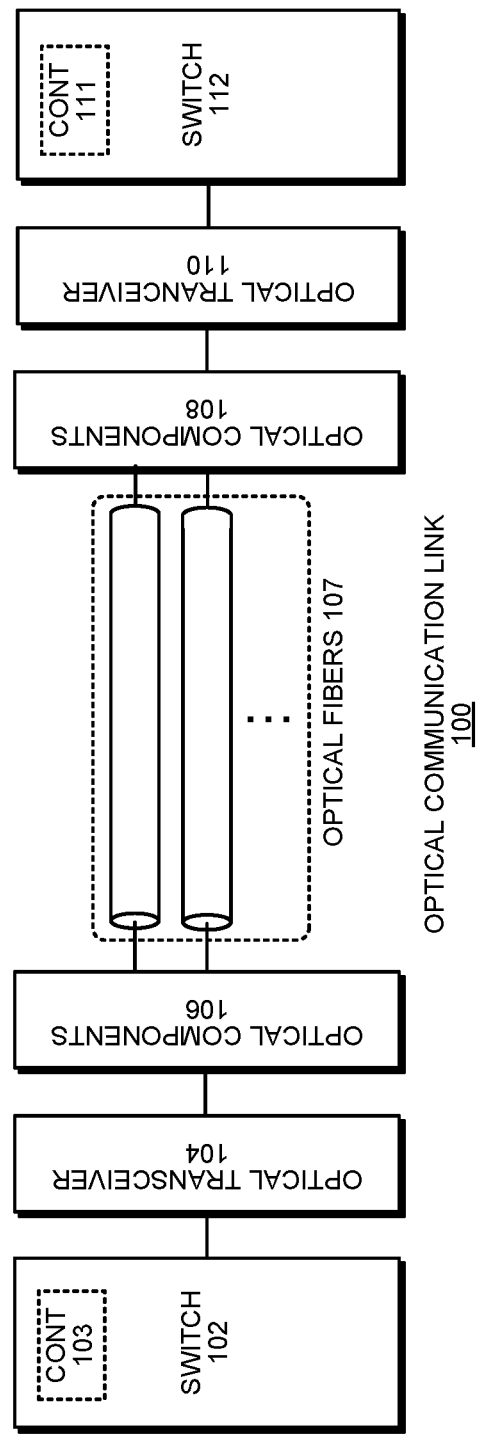
FIG. 1 illustrates an optical communication link in accordance with the disclosed embodiments.

FIG. 1 illustrates an exemplary optical communication link 100 in accordance with the disclosed embodiments. Optical communication link 100 is used to communicate data between switches 102 and 112, which operate in the electrical domain. During operation, when data is communicated from switch 102 to switch 112, an electrical signal containing the data feeds from switch 102 into an electrical interface of an optical transceiver 104, which converts the electrical signal into a corresponding optical signal. This optical signal feeds through a set of optical components 106 (which includes one or more optical components) and then across one or more optical fibers 107 and into another set of optical components 108 on the other side of the link. The optical signal then feeds into an optical interface of optical transceiver 110, which converts the optical signal back into an electrical signal, and then feeds the electrical signal into switch 112. Note that each of the one or more optical fibers 107 may be unidirectional or bidirectional and also may be able to communicate multiple optical wavelengths simultaneously.

For communications in the other direction, when data is communicated from switch 112 to switch 102, an electrical signal containing the data feeds from switch 112 into an electrical interface of an optical transceiver 110, which converts the electrical signal into a corresponding optical signal. This optical signal feeds through the set of optical components 108 (which includes one or more optical components) and then across one or more optical fibers 107 and into the set of optical components 106 on the other side of the link. The optical signal then feeds into an optical interface of optical transceiver 104, which converts the optical signal back into an electrical signal, and then feeds the electrical signal into switch 102.

To enable optical communication link 100 to operate properly at high speeds, optical communication link 100 must be properly initialized. This involves configuring link parameters, such as: a link speed; a lane width for the link; and a lane ordering for the link. It also involves tuning equalization settings to filter out noise in optical communication link 100. This can be accomplished by adjusting resistance, capacitance and/or inductance settings for various analog components in optical communication link 100.

This initialization process for optical communication link 100 is controlled by a controller 103 located in switch 102 on a first side of optical communication link 100, and a controller 111 located in switch 112 on a second side of optical communication link 100. Controllers 103 and 111 each include a processor and a memory that can execute code to control the link-initialization process. Thus, controllers 103 and 111 may include one or more program modules or sets of instructions stored in a memory, such as DRAM or another type of volatile or non-volatile computer-readable memory, which, during operation, are executed by a processor. Furthermore, instructions in the various modules in the memory may be implemented in: a high-level procedural language, an object-oriented programming language, and/or in an assembly or machine language. Note that the programming language may be compiled or interpreted, e.g., configurable or configured, to be executed by the processing subsystem. The functionality on controllers may be implemented more in hardware and less in software, or less in hardware and more in software, as is known in the art. (Note that although the disclosed embodiments are directed to optical communication links, these techniques can also be applied to other types of communication media, such as copper wires. Hence, the techniques disclosed herein are not meant to be limited to optical communication links.)

Link-Configuration Process

Figure 2:
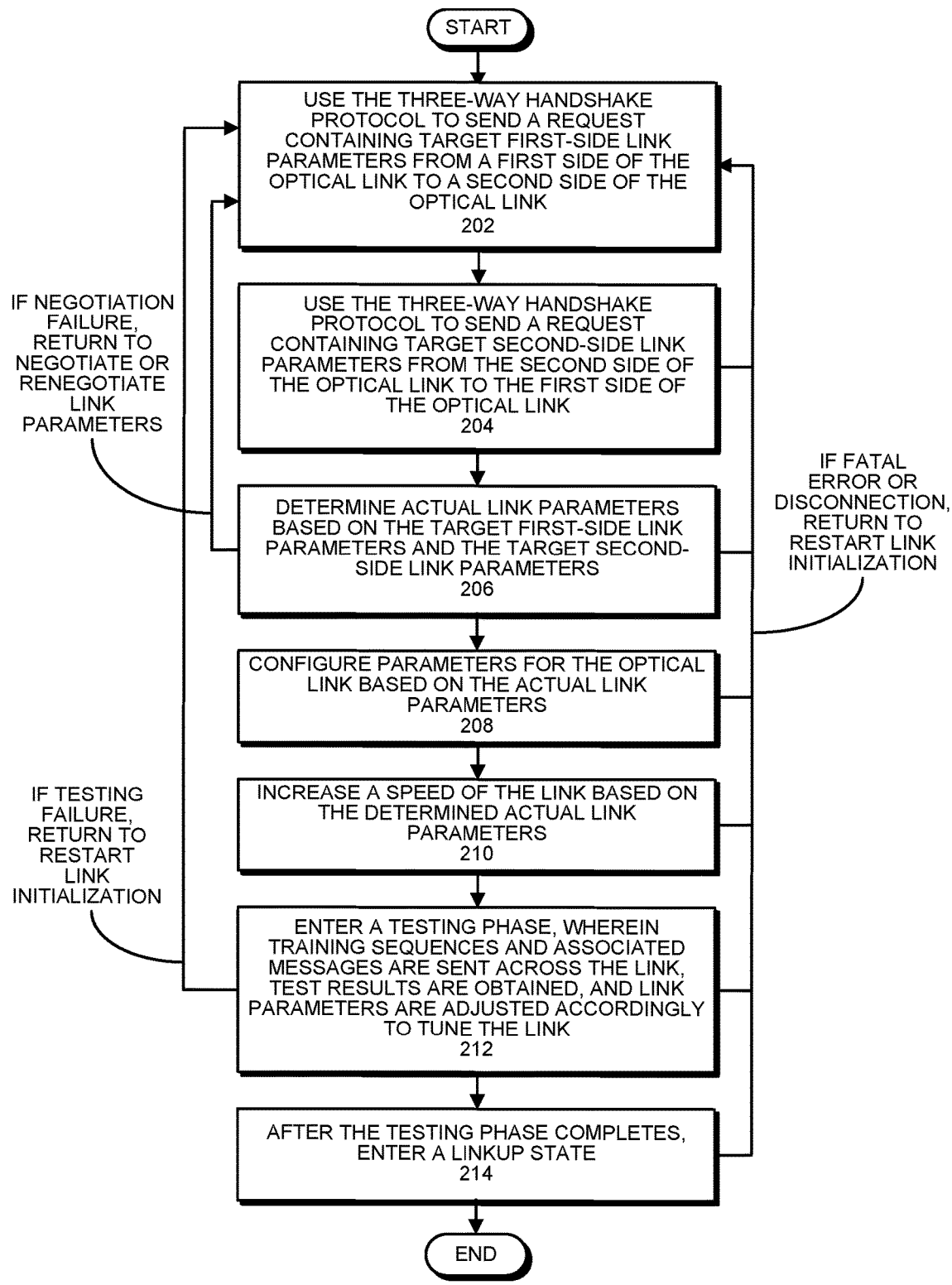
FIG. 2 presents a flow chart illustrating the process of initializing an optical communication link in accordance with the disclosed embodiments.

FIG. 2 presents a flow chart illustrating operations involved in the link-configuration process in accordance with the disclosed embodiments. First, when an optical link is initially established, on a first side of the link, the system uses a three-way handshake protocol to communicate a request containing target first-side link parameters from the first side of the optical link to a second side of the optical link (step 202). The system also uses the three-way handshake protocol to communicate a request containing target second-side link parameters from the second side of the optical link to the first side of the optical link (step 204). Next, the system determines actual link parameters based on the target first-side link parameters and the target second-side link parameters (step 206). In the case of a negotiation failure, which causes the target first-side and second-side parameters to be inconsistent, the actual link parameters cannot be determined and the system returns to step 202 to negotiate or renegotiate the link parameters, wherein some of the link parameters can be related to port properties and capabilities. Note that this failure to negotiate can be due to versioning problems, or other incompatibilities for the advertised properties. Also, based on what is returned during 206, the next round of negotiations in state 202 may have a different starting point.

After the actual link parameters are successfully determined in step 406, the system configures the link based on the actual link parameters (step 208). Next, the system increases a speed of the optical link based on the actual link parameters (step 210). The system subsequently enters a testing phase, wherein training sequences and associated messages are sent across the optical link, test results are obtained, and link parameters are adjusted accordingly to tune the optical link (step 212). Note that the associated messages can contain various information specifying which operations need to be performed to configure the link, and to clean up noise on the optical link. By communicating through these messages, the two sides of the link are able to reach an agreement about which operations need to be performed. If a failure occurs during the testing phase in step 212, the system returns to step 202 to restart the link-initialization process.

After the testing phase completes, the link-initialization process is complete, and system enters a LinkUp state (step 214), such as the LinkUp state defined in the InfiniBand™ networking protocol. During this LinkUp state, the optical link carries optical signals that communicate data between the first and second sides of the optical link.

While the system is executing any of the above-listed states, if a fatal error or a disconnection is detected, for example through a hardware timer or software based programmed input/output (PIO), the system returns to step 202 to restart the link-initialization process. During this restarting process, the first side of the link to execute step 202 and the second side of the link to execute step 204.

Interactions Based on Three-Way Handshakes

Figure 3:
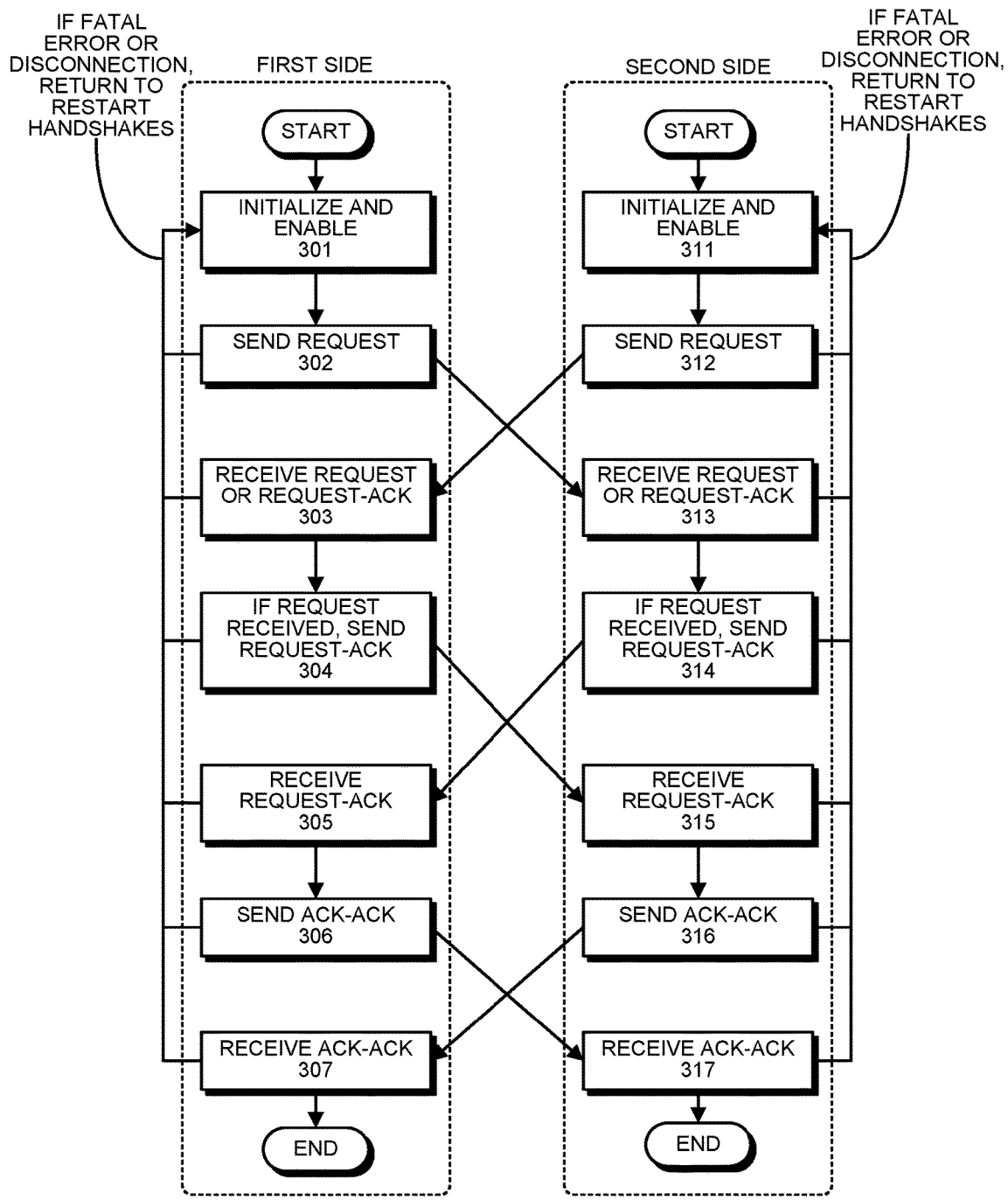
FIG. 3 presents a flow diagram illustrating three-way handshakes between a first side and a second side of the communication link during the link-initialization process in accordance with the disclosed embodiments.

FIG. 3 presents a flow diagram illustrating three-way handshakes between a first side and a second side of the optical link during the link-initialization process in accordance with the disclosed embodiments.

During the link-initialization process, the first side of the optical link operates as follows. The system first performs various initialization and enabling operations on the first side of the link (step 301). Next, the system sends a request to the second side of the link (step 302). Note that this request can include target first-side link parameters, such as: a desired link speed; a desired lane width for the optical link; a desired lane ordering for the optical link; and optimal equalization settings for the first side of the optical link. Then, the system receives from the second side either a request or a request-acknowledgment (request-ACK) for the previously sent request (step 303), depending on the relative speeds of the first and second sides of the optical link.

If a request is received from the second side of the link at step 303, in response the system sends a request-ACK (step 304) to the second side of the link. This causes the second side of the link to send an acknowledgment-acknowledgment (ACK-ACK) to the first side of the link. This ACK-ACK is ultimately received at the first side of the link to complete the three-way handshake (step 307).

When a request-ACK for the previously sent request is received from the second side of the link (step 305), in response the system returns an ACK-ACK to the second side of the link (step 306), which is ultimately received at the second side of the link to complete a three-way handshake.

During the link-initialization process, the second side of the optical link operates as follows. The system first performs various initialization and enabling operations at the second side of the link (step 311). Next, the system sends a request to the first side of the link (step 312). This request can include target second-side link parameters, such as: a desired link speed; a desired lane width for the optical link; a desired lane ordering for the optical link; and optimal equalization settings for the second side of the optical link. Then, the system receives from the first side either a request or a request-acknowledgment (request-ACK) for the previously sent request (step 313).

If a request is received from the first side of the link at step 313, in response the system sends a request-ACK (step 314) to the first side of the link. This causes the first side of the link to send an acknowledgment-acknowledgment (ACK-ACK) to the second side of the link. This ACK-ACK is ultimately received at the first side of the link to complete the three-way handshake (step 317).

When a request-ACK for the previously sent request is received from the first side of the link (step 315), in response the system returns an ACK-ACK to the first side of the link (step 316), which is ultimately received at the first side of the link to complete the three-way handshake.

While the system is executing any of the above-listed states, if a fatal error or a disconnection is detected, for example through a hardware timer or software based programmed input/output (PIO), the first side of the link returns to step 301 and the second side of the link returns to step 302 to restart the three-way handshakes. This is indicated the arrows on the left sides of steps 301-307 and the right sides of steps 311-317.

Note that the above-described processes can be interrupt-driven. For example, when a request is received at the first side of the link at step 303, the reception of the request can cause an interrupt to fire, wherein the corresponding interrupt handler causes the request-ACK to be sent to the second side of the link in step 304. Similarly, when the first side of the link receives a request-ACK at step 305, the reception of the request-ACK can cause an interrupt to fire, wherein the corresponding interrupt handler causes the ACK-ACK to be sent to the second side of the link in step 306.

Exemplary Optical Network

Figure 4:
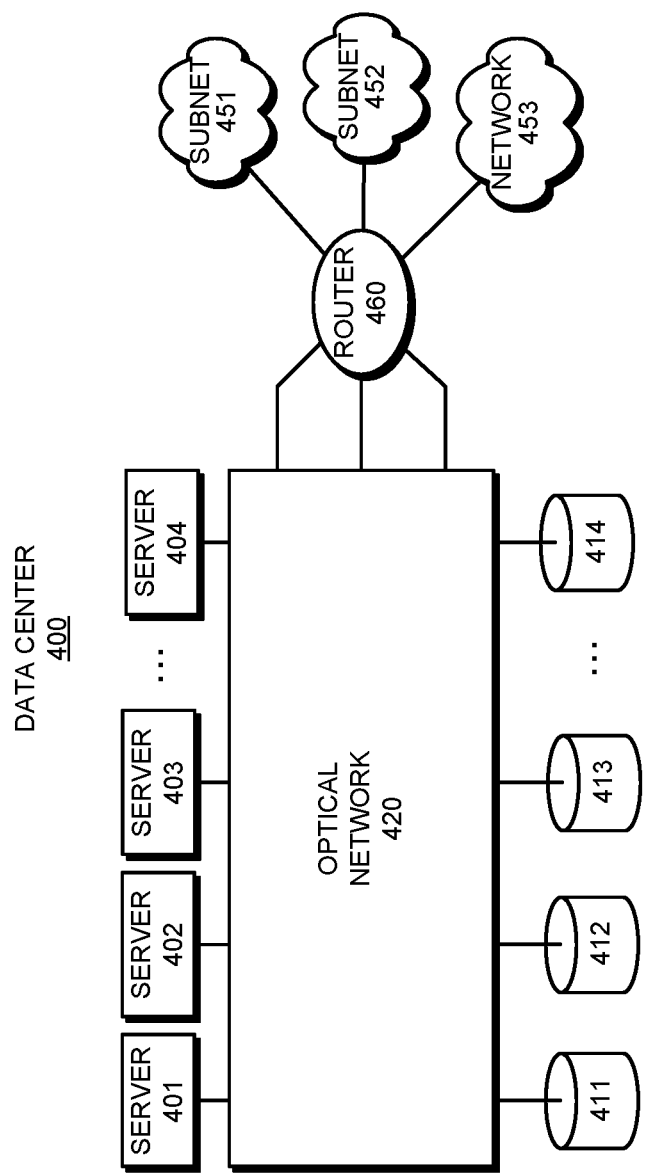
FIG. 4 illustrates an exemplary data center having an optical network, which includes optical communication links in accordance with the disclosed embodiments.

FIG. 4 illustrates an exemplary data center with an optical network, which includes optical communication links in accordance with the disclosed embodiments. As illustrated in FIG. 4, data center 400 comprises an optical network 420, which connects various end-nodes, including servers 401-404, storages devices 411-414 and a router 460. Router 460 can be used to connect data center 400 to various subnets 451-452, and to an external network 453, such as the internet. Note that a data center is only one possible application of the optical network and associated optical links described above. This optical network can generally be used in different contexts to connect different types of end-nodes, and is not meant to be limited to data-center-based applications.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for initializing communications across a communication link, wherein on a first side of the communication link, the method comprises:
　　using a three-way handshake protocol to send a request containing target first-side link parameters from the first side of the communication link to a second side of the communication link;
　　using the three-way handshake protocol to receive a request containing target second-side link parameters from the second side of the communication link at the first side of the communication link;

determining actual link parameters based on the target first-side link parameters and the target second-side link parameters;

configuring the communication link based on the actual link parameters; and entering a testing phase, wherein training sequences and associated messages are sent across the communication link, test results are obtained, and link parameters are adjusted accordingly to tune the communication link and to filter out noise.

2. The method of claim 1, wherein on the second side of the communication link, the method comprises:

using the three-way handshake protocol to send a request containing target second-side link parameters from the second side of the communication link to the first side of the communication link;

using the three-way handshake protocol to receive a request containing target first-side link parameters from the first side of the communication link at the second side of the communication link;

determining actual link parameters based on the target first-side link parameters and the target second-side link parameters; and configuring the communication link based on the actual link parameters.

3. The method of claim 2, wherein determining the actual link parameters involves negotiating the actual link parameters based on communications sent through one or more rounds of requests between the first and second sides of the communication link.

4. The method of claim 1, wherein configuring the communication link additionally involves:

increasing a speed of the communication link based on the determined actual link parameters.

5. The method of claim 1, wherein the target first-side link parameters, the target second-side link parameters, and the actual first-side link parameters include:

a link speed;

a lane width for the communication link;

a lane ordering for the communication link;

a port bifurcation associated with the communication link; and optimal equalization settings for the communication link.

6. The method of claim 1, wherein the communication link uses the InfiniBand™ networking protocol; and wherein the three-way handshake protocol is implemented as an extension to the InfiniBand™ networking protocol.

7. The method of claim 6, wherein prior to using the three-way handshake protocol, the method further comprises:

determining whether the first and second sides of the communication link are configured to use the extension to the InfiniBand™ networking protocol;

when either the first or second side of the communication link is not configured to use the extension, reverting to using the unextended InfiniBand™ networking protocol without the three-way handshake to initialize the communications across the communication link.

8. The method of claim 6, wherein after the process of configuring the communication link based on the actual link parameters completes, the method further comprises entering a LinkUp state for the InfiniBand™ networking protocol.

9. The method of claim 1, wherein using the three-way handshake to send a request to a destination involves:

sending the request to the destination;

receiving a request-acknowledgment from the destination; and sending an acknowledgment-acknowledgment to the destination.

10. The method of claim 1, wherein using the three-way handshake to receive a request from a source involves:

receiving the request from the source;

sending a request-acknowledgment to the source; and receiving an acknowledgment-acknowledgment from the source.

11. A non-transitory computer-readable storage medium storing instructions that when executed by a computer cause the computer to perform a method for initializing communications across a communication link, wherein on a first side of the communication link, the method comprises:

using a three-way handshake protocol to send a request containing target first-side link parameters from the first side of the communication link to a second side of the communication link;

using the three-way handshake protocol to receive a request containing target second-side link parameters from the second side of the communication link at the first side of the communication link;

determining actual link parameters based on the target first-side link parameters and the target second-side link parameters;

configuring the communication link based on the actual link parameters; and entering a testing phase, wherein training sequences and associated messages are sent across the communication link, test results are obtained, and link parameters are adjusted accordingly to tune the communication link and to filter out noise.

12. The non-transitory computer-readable storage medium of claim 11, wherein on the second side of the communication link, the method comprises:

using the three-way handshake protocol to send a request containing target second-side link parameters from the second side of the communication link to the first side of the communication link;

using the three-way handshake protocol to receive a request containing target first-side link parameters from the first side of the communication link at the second side of the communication link;

determining actual link parameters based on the target first-side link parameters and the target second-side link parameters; and configuring the communication link based on the actual link parameters.

13. The non-transitory computer-readable storage medium of claim 12, wherein determining the actual link parameters involves negotiating the actual link parameters based on communications sent through one or more rounds of requests between the first and second sides of the communication link.

14. The non-transitory computer-readable storage medium of claim 11, wherein configuring the communication link additionally involves:

increasing a speed of the communication link based on the determined actual link parameters.

15. The non-transitory computer-readable storage medium of claim 11, wherein the target first-side link parameters, the target second-side link parameters, and the actual first-side link parameters include:

a link speed;
a lane width for the communication link;
a lane ordering for the communication link;
a port bifurcation associated with the communication link; and
optimal equalization settings for the communication link.

16. The non-transitory computer-readable storage medium of claim 11,
wherein the communication link uses the InfiniBand™ networking protocol; and
wherein the three-way handshake protocol is implemented as an extension to the InfiniBand™ networking protocol.

17. The non-transitory computer-readable storage medium of claim 16, wherein prior to using the three-way handshake protocol, the method further comprises:
determining whether the first and second sides of the communication link are configured to use the extension to the InfiniBand™ networking protocol;
when either the first or second side of the communication link is not configured to use the extension, reverting to using the unextended InfiniBand™ networking protocol without the three-way handshake to initialize the communications across the communication link.

18. The non-transitory computer-readable storage medium of claim 16, wherein after the process of configuring the communication link based on the actual link parameters completes, the method further comprises entering a LinkUp state for the InfiniBand™ networking protocol.

19. The non-transitory computer-readable storage medium of claim 11, wherein using the three-way handshake to send a request to a destination involves:

sending the request to the destination;
receiving a request-acknowledgment from the destination; and
sending an acknowledgment-acknowledgment to the destination.

20. A system that initializes communications across a communication link, comprising:
at least one processor and at least one associated memory; and
a link-initialization mechanism that executes on the at least one processor, wherein during operation, the link-initialization mechanism:
uses a three-way handshake protocol to communicate a request containing target first-side link parameters from a first side of the communication link to a second side of the communication link;
uses the three-way handshake protocol to communicate a request containing target second-side link parameters from the second side of the communication link to the first side of the communication link;
determines actual link parameters based on the target first-side link parameters and the target second-side link parameters;
configures the communication link based on the actual link parameters; and
enters a testing phase, wherein training sequences and associated messages are sent across the communication link, test results are obtained, and link parameters are adjusted accordingly to tune the communication link and to filter out noise.

* * * * *